United States Patent
Goyal et al.

(10) Patent No.: US 10,609,452 B2
(45) Date of Patent: Mar. 31, 2020

(54) AUDIENCE FORECASTING FOR DIGITAL VIDEO CONTENT

(71) Applicant: Adobe Inc., San Jose, CA (US)

(72) Inventors: Praveen Kumar Goyal, Noida (IN); Ashish Duggal, Delhi (IN); Atul Kumar Shrivastava, Noida (IN); Prakash Tripathi, Noida (IN); Kumar Mrityunjay Singh, Bengaluru (IN)

(73) Assignee: Adobe Inc., San Jose, CA (US)

( * ) Notice: Subject to any disclaimer, the term of this patent is extended or adjusted under 35 U.S.C. 154(b) by 19 days.

(21) Appl. No.: 15/825,521

(22) Filed: Nov. 29, 2017

(65) Prior Publication Data

US 2019/0166402 A1   May 30, 2019

(51) Int. Cl.

| | |
|---|---|
| *H04N 21/466* | (2011.01) |
| *G06Q 30/02* | (2012.01) |
| *H04N 21/262* | (2011.01) |
| *G06F 17/12* | (2006.01) |
| *G06F 16/2457* | (2019.01) |
| *H04N 21/258* | (2011.01) |
| *H04N 21/81* | (2011.01) |
| *G06F 16/735* | (2019.01) |

(52) U.S. Cl.
CPC ... *H04N 21/4667* (2013.01); *G06F 16/24578* (2019.01); *G06F 16/735* (2019.01); *G06F 17/12* (2013.01); *G06Q 30/0202* (2013.01); *H04N 21/25866* (2013.01); *H04N 21/26241* (2013.01); *H04N 21/812* (2013.01)

(58) Field of Classification Search
None
See application file for complete search history.

(56) References Cited

U.S. PATENT DOCUMENTS

| | | | |
|---|---|---|---|
| 2003/0101454 A1* | 5/2003 | Ozer | G06Q 30/02 725/42 |
| 2013/0226613 A1* | 8/2013 | Srinivasan | G06Q 50/24 705/3 |
| 2015/0189351 A1* | 7/2015 | Kitts | G06Q 30/0242 725/19 |
| 2016/0007093 A1* | 1/2016 | Liu | G06Q 30/02 725/32 |
| 2016/0134934 A1* | 5/2016 | Jared | H04N 21/44213 725/14 |
| 2016/0227297 A1* | 8/2016 | Bennett | H04N 21/812 |

\* cited by examiner

*Primary Examiner* — Michael R Telan
(74) *Attorney, Agent, or Firm* — SBMC

(57) ABSTRACT

Techniques and systems are described to enable an analytics system to generate a forecast value for audience impressions of subsequent digital video content. In one example, an analytics system generated a linear regression model using data. The data describes audience segment values for past audience impressions of digital video content and a time series of when the digital video content is made available for consumption. The analytics system generates forecast values for audience impressions of digital video content using the linear regression model. In one example, the analytics system generates a forecast value for audience impressions of a subsequent item of digital video content based on scheduled availability for the subsequent item.

20 Claims, 6 Drawing Sheets

AUDIENCE FORECASTING FOR DIGITAL VIDEO CONTENT

BACKGROUND

Digital video content has an increased ability to capture and hold a user's attention over other types of digital content. Digital video content, for instance, has an ability to hold a user's attention over a length of output of the digital video content, as opposed to view of a static digital images such as banner ads and webpage popups as part of a webpage, mobile application, and so forth.

Conventional content distribution systems that provide digital video content, e.g., for streaming via a network, also sell opportunities to output digital marketing content based on the particular items of digital video content that are to be output in conjunction with the digital marketing content. A content distribution system, for instance, may provide an opportunity at a beginning of a sitcom to output digital marketing content. Conventionally, a digital marketing system may then choose whether to output an advertisement at this opportunity. Thus, conventional digital marketing techniques used for digital video content relied on "what" is being shown in the digital video content, and from this made a best guess as to "who" may be watching the digital video content. Accuracy of this best guess by conventional digital marketing techniques is further complicated by digital video content having episodes that have not yet been made available, e.g., future episodes of a video series that have not yet "aired."

SUMMARY

Techniques and systems are described to forecast audience impressions for episodic digital video content. Digital video content, for instance, may be configured for output as a sequential series of episodes as part of a video series. In the techniques and systems described herein, knowledge of audience impressions involves past episodes of a video series and a schedule of those episodes are used by an analytics system to predict audience impressions for future episodes of the video series that have not yet been made available, in other words have not yet "aired." In this way, these techniques may provide accurate insight into future audiences for episodes of digital video content from the video series, which is not possible using conventional techniques and systems that do not address the scheduled output of digital video content.

In one example, an analytics system generates a linear regression model. Linear regression is a linear approach used by the analytics system to model a relationship between a scalar dependent variable "Y" and an explanator variable denoted as "X." This may be used, for instance, for data that includes a number of impressions "Y" of an audience segment over a period of time "X," e.g., days. The data, for instance, may describe audience segment values for past audience impressions of digital video content and a time series of when the digital video content is made available for consumption, e.g., a schedule of episodes of a video series. The linear regression model, once generated based on the data, is thus configured to generate forecast data as a linear function of scheduled output of subsequent digital video content, even for episodes of digital video content that are not currently available, i.e., for future episodes that have not yet "aired" or otherwise have been made publicly available. In one example, the forecast value is generated and output in real-time in response to a request, such as from a user.

The forecast value allows digital marketing systems to select digital marketing content with increased accuracy to determine a likely number of audience impressions for a target audience segment. As a result, the linear regression model may support increased efficiency and accuracy over conventional techniques and systems that are not capable of addressing these future aspects of digital video content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
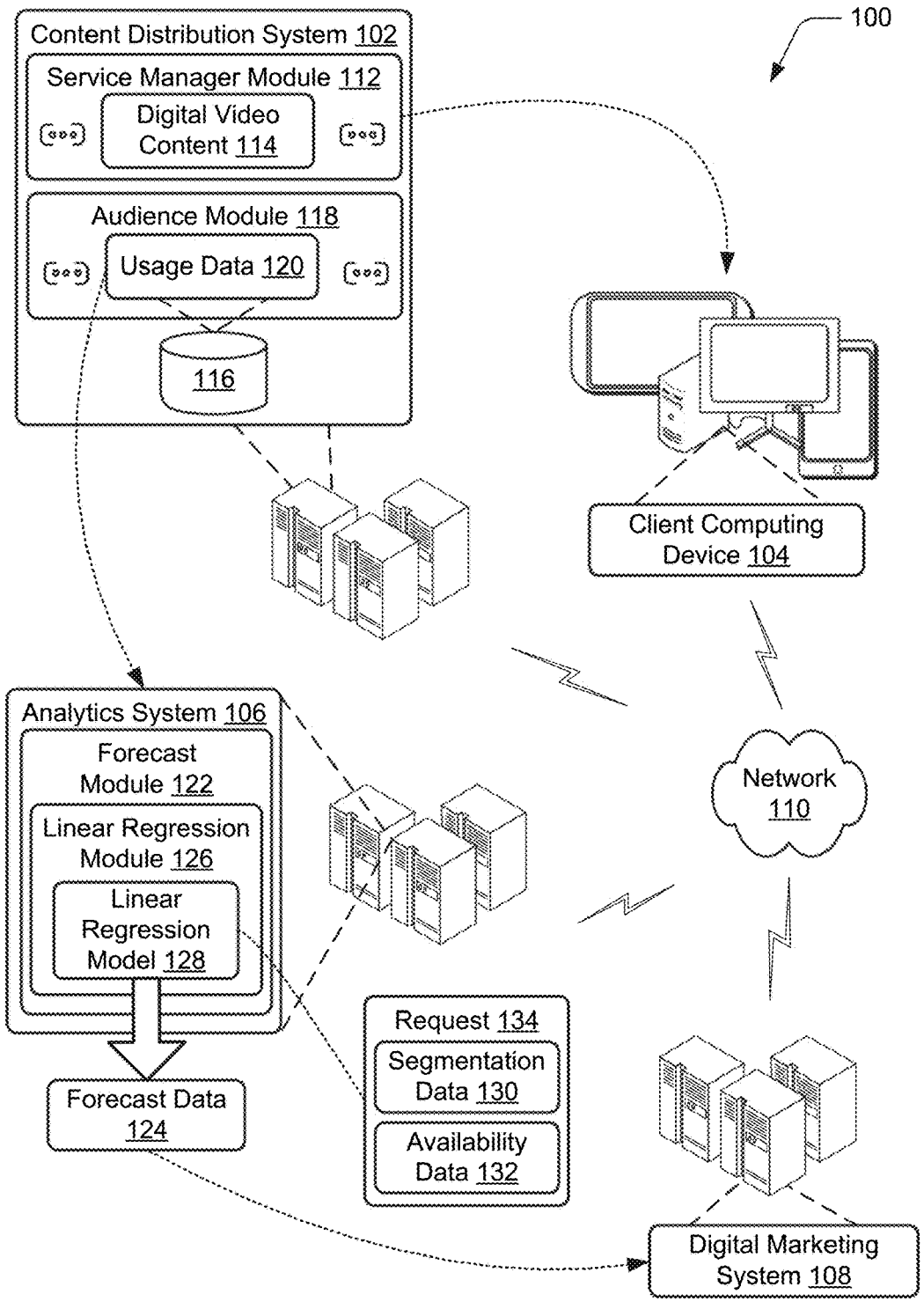
FIG. 1 is an illustration of a digital medium environment in an example implementation that is operable to employ audience forecasting techniques described herein.

Conventional digital marketing systems make decisions on whether to purchase opportunities to output digital marketing content based on which particular items of digital video content are to be output in conjunction with the digital marketing content. A television network, for instance, may sell opportunities to a digital marketing system to output digital marketing content at a second ad slot in a pre-roll ad break for all episodes of a particular video series. Thus, digital marketing systems in these conventional techniques are faced with making a best guess as to which users view the digital video content and whether those users will find the digital marketing content of interest.

To address inaccuracies encountered as part of these conventional "best guess" techniques, conventional techniques have further developed such that digital marketing systems may target audience segments of a user population. Audience segments, for instance, may be defined based on characteristics of a user population such as age, geographic location of the user, types of devices used, and so on. Thus, a specific item of digital marketing content may be shown based on the characteristics of the user and is not based on the digital video content, itself. For example, a publisher may agree to show an athletic shoe ad to all users who are described as sports enthusiasts, no matter what series or show the users are watching.

To do so, conventional techniques have been developed for an analytics system to track historical impressions from each segment of a user population and from this, forecast future impressions for segments of a user population. One conventional example of a forecasting technique involves autoregressive integrated moving average (ARIMA) models. The ARIMA model is employed by the conventional analytics systems to separate a signal (e.g., impressions of digital video content) from the noise. The separated signal is then extrapolated by the conventional analytics systems into the future to generate forecast data.

In order to generate forecast values for a particular audience segment, however, conventional analytics systems generated forecast values for that element by extrapolating trends and patterns for that time series in the past, alone. For instance, ARIMA simply extrapolates a trend for past impressions into the future in order to forecast future impressions for digital video content. However, in practice impressions by audience segments of a user population typically do not exhibit a clear pattern or seasonality. As such, conventional forecasting techniques (e.g., ARIMA) do not address a schedule of content availability, which may include a schedule of availability of digital video content in the future. Consequently, conventional analytics systems ignore potentially useful insight that may be gained from a schedule of future events that might exhibit similar behavior and thus improve accuracy.

Accordingly, techniques and systems are described to generate forecast data based on scheduled output of digital video content, such as to address audience-based packaging of episodic content. As a result, the forecast data for the digital video content is generated with increased accuracy by leveraging a schedule indicating availability of digital video content, both in past and in the future.

To do so, an analytics system generates a model using linear regression (hereinafter also referred to as a "linear regression model") based on past impressions of segments of a user population with respect to past episodes of digital video content of a video series. The model is also generated based on schedule data indicating a time, at which, the past episodes of the video series are made available and a time, at which, a future episode of the video series is to be made publically available in the future. Linear regression is a linear approach used by the analytics system to model a relationship between a scalar dependent variable "Y" and an explanator variable denoted as "X." This may be used, for instance, for data that includes a number of impressions "Y" of an audience segment over a period of time "X," e.g., hours, days, weeks, months, and so on. The data, for instance, may describe past audience impressions of digital video content (e.g., for particular audience segments) and a time series of when the digital video content is made available for consumption, e.g., a schedule of episodes of a video series both in the past and in the future. The linear regression model, once generated based on the data, is thus configured to generate forecast data as a linear function of scheduled output of subsequent digital video content, even for episodes of digital video content that are not currently available, i.e., have not "aired."

In one example, the forecast value is output in real-time in response to a request. For instance, the request is input by a user via a graphical user interface ("GUI") displayed by a computing device. Outputting the forecast value in real-time, in response to a request, allows content distribution systems to select digital video content to package based on a target audience segment with increased speed and accuracy to determine a likely number of audience impressions for the target audience segment.

The forecast data may support a variety of functionality. A content distribution system and/or the digital marketing system, for instance, may use the forecast data to package digital video content as audience-based inventory. For example, data describing a scheduled output for items of digital video content may be used by the analytics system to generate forecast data (e.g., a value indicating a number of impressions) for audience segments. Based on this forecast data, items of digital video content (e.g., episodes of a video series) that exhibit similar audience forecast values for a same or similar audience segment may be packaged into an audience based inventory package for use by a digital marketing system. In this way, digital marketing systems may target digital marketing content to particular audience segments based on these packages, even for future episodes in a video series. Thus, these techniques are applicable to a wider range of digital video content that cannot be described by extrapolating data based on past impressions, alone, as performed by conventional systems. The problem of analyzing data for packaging digital video content and selecting digital marketing in conjunction with digital video content is a problem necessarily rooted in digital video distribution and digital marketing technologies. As a result, the linear regression model as employed by the analytics system solves a problem specifically arising in real-time forecasting of digital video content target audience behavior with increased efficiency and accuracy over conventional techniques and systems that are not capable of addressing these aspects of digital video content as further described in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ audience forecasting techniques described herein. The illustrated environment 100 includes a content distribution system 102, a client computing device 104, an analytics system 106, and a digital marketing system 108 that are communicatively coupled, one to another, via a network 110. Computing devices that implement the content distribution system 102, the client computing device 104, the analytics system 106, and the digital marketing system 108 may be configured in a variety of ways.

Figure 6:
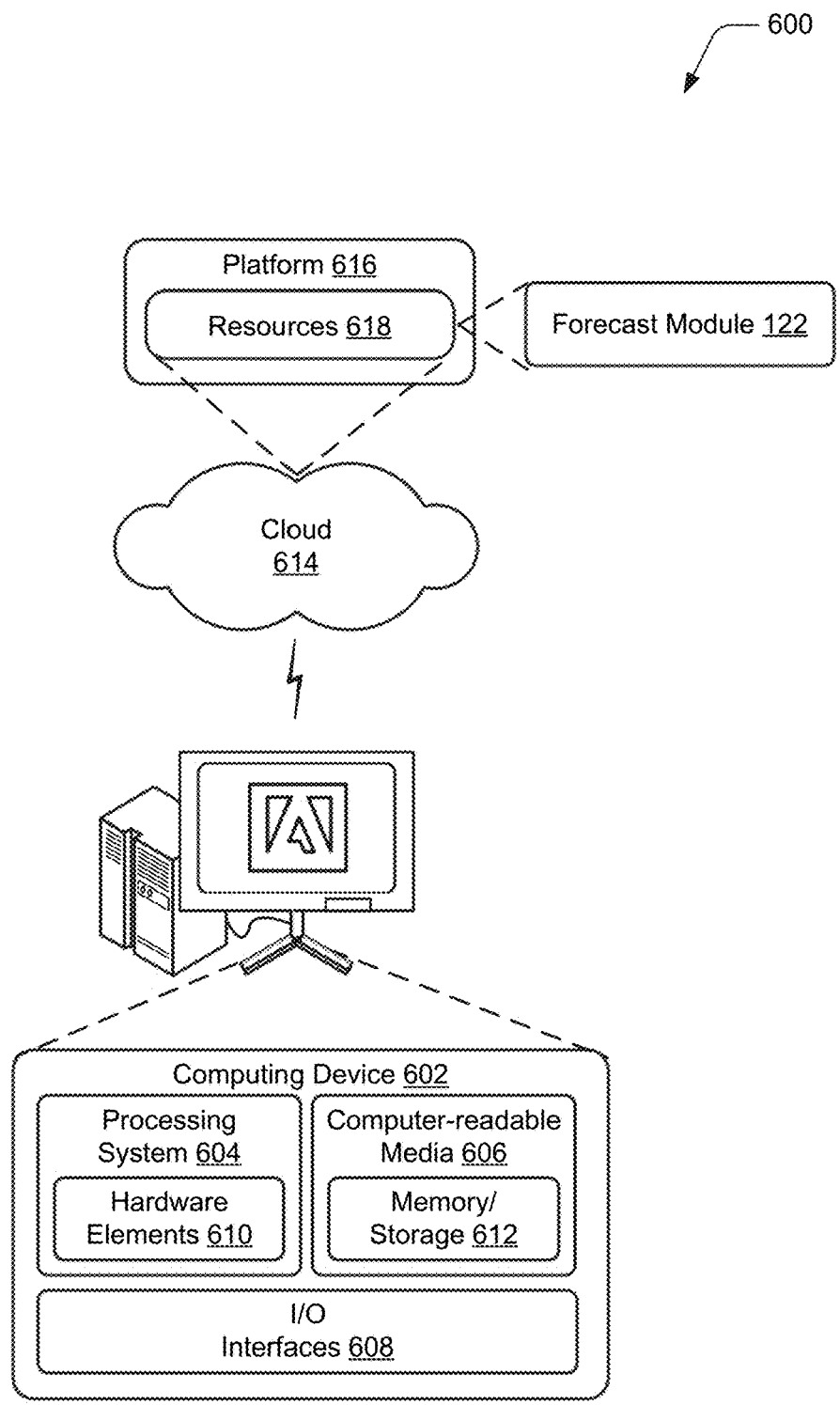
FIG. 6 illustrates an example system including various components of an example device that can be implemented as any type of computing device as described and/or utilize with reference to FIGS. 1-5 to implement embodiments of the techniques described herein.

A computing device, for instance, may be configured as a desktop computer, a laptop computer, a mobile device (e.g., assuming a handheld configuration such as a tablet or mobile phone), and so forth. Thus, the computing device may range from full resource devices with substantial memory and processor resources (e.g., personal computers, game consoles) to a low-resource device with limited memory and/or processing resources (e.g., mobile devices). Additionally, although a single computing device is described in instance of the following, a computing device may be representative of a plurality of different devices, such as multiple servers utilized by a business to perform operations "over the cloud"

as shown for the content distribution system 102 and the analytics system 106, and as further described in FIG. 6.

The content distribution system 102 is illustrated as including a service manager module 112 that is implemented at least partially in hardware of a computing device. The service manager module 112 is configured to manage online distribution of digital video content 114 of the content distribution system 102 via the network 110. The digital video content 114, for instance, is distributed from a storage device 116 to the client computing device 104 via the network 110 for consumption. The content distribution system 102 may be associated with a publisher of the digital video content 114. Consumption of the digital video content 114 may take a variety of forms, such as streaming video, a video file available for download by the client computing device 114, and so forth.

The digital video content 114 is configurable in a variety of ways. For example, the digital video content 114 may be configured as a feature length movie, movie short, television episode, webisode, clip, live stream, advertisement, and so forth. The digital video content 114 is described herein as serialized episodes, a collection of which forms a season. However, it should be understood that the video digital content 114 may be formatted in a manner other than episodes as described above.

The content distribution system 102 is illustrated as including an audience module 118 that is implemented at least partially in hardware of a computing device. The audience module 118 is configured to generate usage data 120, which describes distribution and consumption of the digital video content 114. The usage data 120, for instance, is generated by the audience module 118 based on data collected by the service manager module 112. In another instance, the usage data 120 is generated by the audience module 118 based on data collected by the client computing device 114. The usage data 120 describes a number of audience impressions for the digital video content 114. Audience impressions may include values describing a variety of data, e.g., number of views, number of views for an audience segment, number of advertising conversions, number of advertising click-throughs, and so forth.

Additionally and alternatively, the usage data 120 may describe characteristics of the digital video content 114 distributed to the client computing device 114 from the content distribution system 102. Characteristics of the digital video content 114 described by the usage data 120 may be associated with content (e.g., genre, production credits, video length, episode number, season number, year produced) and/or schedule of availability (e.g., time and date available for consumption, and so forth). The digital video content 114 may be made available for consumption by the content distribution system 102 in a same, similar, or different manner that the digital video content 114 is broadcast or distributed through conventional methods. In some implementations, the video digital content 114 is consumed by an audience via the client computing device 104 at the same time that the corresponding content is aired for broadcast. While in other implementations, the video digital content 114 is consumed by an audience via the client computing device 104 after a period of time elapses following broadcast. In another implementation, the video digital content 114 is consumed by an audience via the client computing device 104 after a full season has been broadcast.

Additionally and alternatively, the usage data 120 describes characteristics of an audience consuming the digital video content 114. As used herein, "audience" refers to a user or any number of users who consume the digital video content 114 of the content distribution system 102 via the client computing device 114. Characteristics of the audience consuming the digital video content 114 may be associated with users included in the audience. For instance, the usage data 120 for the audience may be demographic (e.g., age, age group, gender, income, language), geographic, behavioral (browsing history, viewing history, clickthrough rate), and so forth. A variety of other instances of the usage data 120 associated with consumption of the digital video content 114 are also contemplated, such as device type (e.g., desktop, phone, tablet, set-top box), viewing platform (e.g., website, web application, mobile application), and so forth. Thus, the usage data 120 may describe characteristics of the digital video content 114 and/or characteristics of the consumption of the digital video content 114.

The usage data 120 in this example is collected by the analytics system 106, via the network 110. The analytics system 106 includes a forecast module 122 that is implemented at least partially in hardware of a computing device (e.g., a processing system and computer readable storage medium) to generate forecast data 124. For instance, forecast data 124 may include values of audience impressions of the digital video content 114 that are described in the usage data 120.

To do so, the forecast module 122 employs a linear regression module 126 that is implemented at least partially in hardware of a computing device. The linear regression module 126 represents functionality to generate and use a linear regression model 128 that is usable for forecasting audience impressions for a subsequent item of the digital video content 114. The linear regression module 126, for instance, receives data describing audience impressions for the digital video content 114 and availability for the digital video content 114. In some implementations, the audience impressions are received as segmentation data 130 that defines characteristics of an audience segment. Audience segments are subsets of an audience having homogeneous characteristics. The characteristics used to indicate the segments may include defined criterion in categories such as product usage, demographics, psychographics, communication behaviors and media use, to name a few examples. For instance, the usage data 120 (e.g., audience impressions) is segmented for a particular audience segment defined by the segmentation data 130, e.g., females aged 25-39 consuming the digital video content 114. In one instance, the analytics system 106 receives the segmentation data 130 from the content distribution system 102 or the digital marketing system 108. In another instance, the content distribution system 102 receives the segmentation data 130 from the digital marketing system 108.

The linear regression module 126 also receives availability data 132 that describes a schedule indicating availability of the digital video content 114, which may include availability of the digital video content 114 in the future. The schedule of availability, for instance, specifies a date, time, or day of the week when the digital video content 114 is made available by the content distribution system 102 for consumption by a client computing device 104. The linear regression module 126 then fits the linear regression model 128 to the availability data 132 to generate forecast data 124 for a subsequent item of the digital video content 114 as a linear function of the availability data 132. The availability data 132, as described above, describes a time when subsequent content is available for consumption. For instance, the availability data 132 identifies a future time and date that a future episode of the digital video content 114 of a video series will be available for consume consumption at the client computing device 104 by the content distribution system 102. In at least some implementations, the availability data 132 is obtained from the content distribution system 102. In other implementations, the availability data 132 is obtained and/or received from a variety of sources such as, a content producer, a service provider, and so forth.

The forecast data 124 is illustrated as stored in a storage device of a computing device. In one example, the forecast data 124 is generated in response to a request 134 received at the content distribution system 102, the analytics system 106, or the digital marketing system 108. For instance, the request 134 to generate the forecast data 124 is received as user input via a graphical user interface (GUI) of a computing device. The request 134 may include information identifying segmentation data 130, the availability data 132, and/or the digital video content 114 for which the forecast data 124 is to be generated.

The forecast data 124 may take a variety of forms. In one example, the forecast data 124 is configured to predict future audience impressions of a subsequent item of the digital video content 114, e.g., future episodes of a video series that are not yet publically available. The forecast data 124 may also take into account considerations of the content distribution system 102 in providing digital content, such as video quality, connection speed, and so forth. In a further example, the forecast data 124 predicts future consumption, such as number of downloads, interactions, how interactions occur (e.g., stream, download, browser, mobile application), and so forth. In this way, the linear regression module 126 may uncover associations between scheduled availability of the digital video content 114 and audience impressions of the video digital content 114 that are not readily apparent to a human. In the following discussion, generation and use of the linear regression model to generate the forecast data 124 is described.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
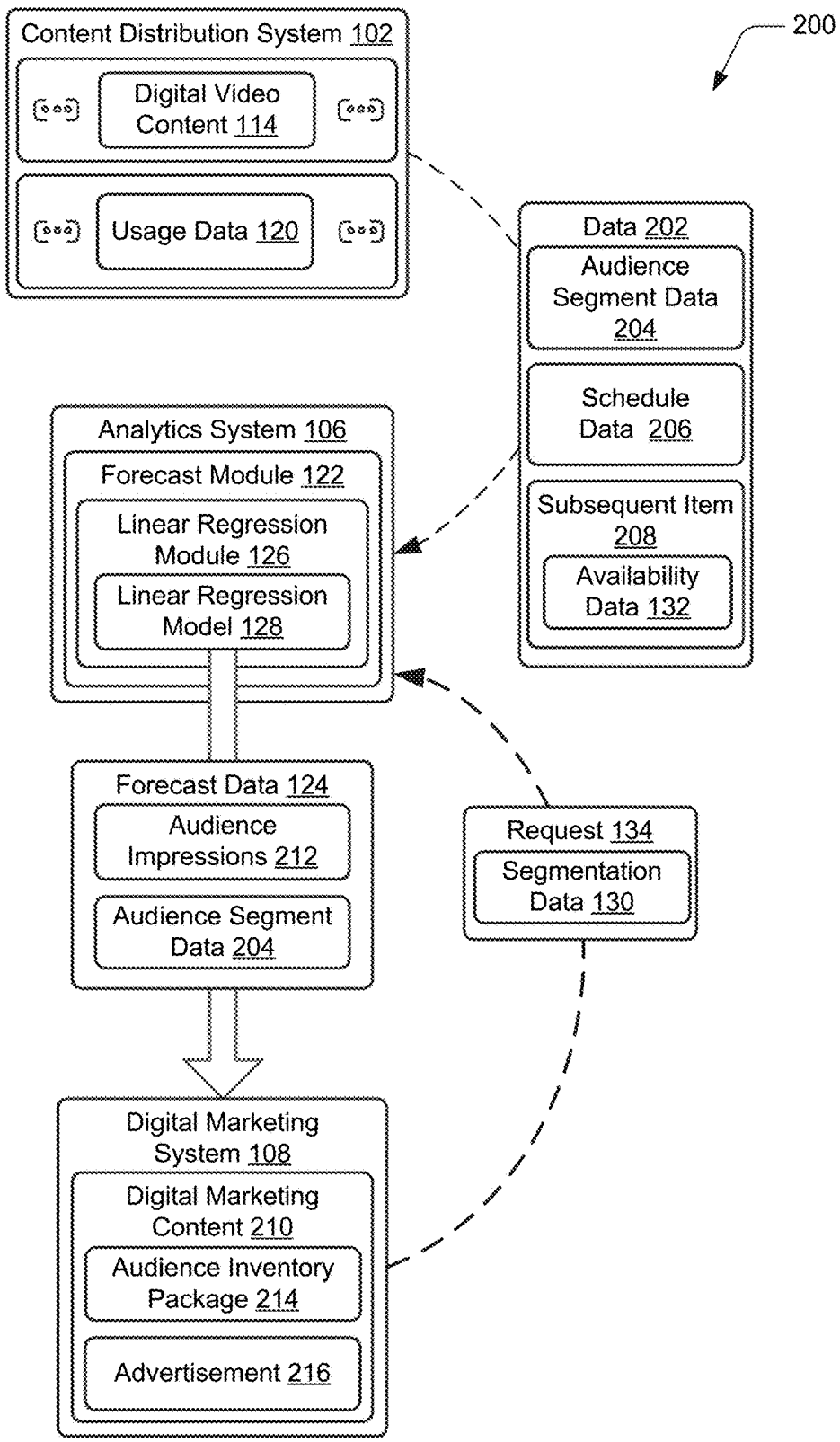
FIG. 2 depicts a system in an example implementation showing operation of a forecast module of FIG. 1 in greater detail as generating and using a linear regression model to generate forecast data.

FIG. 2 depicts a system 200 in an example implementation showing operation of the forecast module 122 of FIG. 1 in greater detail as generating and using a linear regression model to generate forecast data. The forecast module 122 is illustrated as including the linear regression module 126. The linear regression module 126 is implemented at least partially in hardware of a computing device to generate the linear regression model 128. The linear regression model 128 is configured to forecast audience impressions for the digital video content 114 by fitting the linear regression model 128 to the data 202.

Linear regression is a linear approach used by the analytics system 106 to model a relationship between a scalar dependent variable "Y" and an explanator variable denoted as "X." This may be used, for instance, for data 202 that includes audience segment data 204 indicating a number of impressions "Y" of an audience segment over a period of time "X" and schedule data 206 that describes a schedule for output of items of the digital video content 114, i.e., episodes. The audience segment data 204, for instance, may describe audience segment values for past audience impressions of the digital video content 114. The schedule data 206 describes a time series of when the digital video content 114 is made available for consumption, e.g., a schedule of episodes of a video series both in the past and in the future.

The data 202 further describes characteristics of a subsequent item 208 of the digital video content 114 to be forecast. The subsequent item 208 represents data describing an instance of the digital video content 114 (e.g., an episode) for which the forecast data 124 is generated. The subsequent item 208, for instance, may be an episode of a video series that is scheduled to broadcast and/or upload in the future for consumption as the digital video content 114. While the subsequent item 208 is described herein as a single instance of the digital video content 114, it should be understood that the subsequent item 208 may represent a series of instances of the digital video content 114, e.g., a series of episodes.

The audience segment data 204 and the schedule data 206 both include a series of values ordered over time. For example, the audience segment data 204 may include values representing a number of views of the digital video content 114 for a particular audience segment, each value corresponding to a calendar date for which the number of views occurred. In some implementations, the schedule data 206 represents one or a series of calendar dates on which the digital video content 114 was made available for consumption by the content distribution system 102. The period of time represented by the audience segment data 204 and the schedule data 206 may take various configurations such as hourly, daily, weekly, monthly, and quarterly.

In one example, the data 202 is received in whole or in part from the content distribution system 102 as the usage data 120. In this example, the analytics system 106 generates the audience segment data 204 and/or the schedule data 206 from the usage data 120. However in an additional or alternative example, the audience segment data 204 and/or the schedule data 206 are generated by the content distribution system 102 and received by the analytics system 106.

The audience segment data 204 describes past audience impressions for a particular segment of the audience consuming the digital video content 114. According to some implementations, the audience segment data 204 is generated from the usage data 120 based on the segmentation data 130. The audience segment data 204 include values segmented by categories that pertain to a particular audience, such as characteristics described by the usage data 120. For example, the digital video content 114 associated with the data 202 is a television series that includes four episodes in a current season. In the example, the audience segment data 204 describe audience impressions (e.g., views) for each of the four episodes by an audience segment defined by the segmentation data 130 to include female audience members that are between the ages 35-49. While gender and age range are described in the example, it should be understood that various other characteristics of an audience and/or audience segment are contemplated.

The schedule data 206 describes a schedule of availability for the digital video content 114, for instance, a date, time, or day of the week when each episode of the digital video content 114 is made available for consumption by users. Continuing the above example, the digital video content 114 is the television series that includes four episodes and the schedule data 206 describes the past date and/or time that each of the four episodes was available for consumption. The schedule data 206 may also include data describing availability of the digital video content 114 in the future, e.g., the availability data 132.

In some implementations, the availability data 132 may be included in the schedule data 206 to describe availability of the subsequent item 208. As described above, the availability data 132 describes a time at which the subsequent item 208 is to be made available for consumption by an audience. For instance, the availability data 132 identifies a future time and date that a new episode of the digital video content 114 (e.g., the subsequent item 208) will be available to consume via the content distribution system 102. FIG. 2 depicts the availability data 132 being obtained from the content distribution system 102 however it should be understood that the availability data 132 may be obtained from a variety of sources.

Given this data 202, the linear regression module 126 generates the linear regression model 128 to determine a linear relationship between the audience segment data 204 and the schedule data 206. In at least some implementations, the linear regression module 126 generates the model to account for lag effects (e.g., distributed lag) of the data 202. For instance, regression coefficients may be determined that are weighted to account for lagged effects of the scheduled availability of the digital video content 114 on audience impressions distributed over time. The linear regression model 128 may be configured to account for various increments or periods of lagged effects, such as daily, weekly, monthly, and quarterly lag. For example, if a TV episode is released for consumption on day x, lagged effects of the availability of the episode and/or series are exhibited in audience impressions of the episode. In the example, the day following day x will exhibit a lagged effect in audience impressions and the lagged effect may increase each day following the day after day x. Continuing the example, a day that is exactly one week from day x may exhibit a different or the same lagged effect for the episode. In this manner, the linear regression module 126 may produce a model, e.g., the linear regression model 128, configured to forecast values for distribution of serialized episodic content, such as a television series.

In one or more implementations, the linear regression module 126 determines a relationship between past audience impressions (e.g., the audience segment data 204) and past availability of episodic content (e.g., the schedule data 206) while accounting for lag effects of the episodic content according to the following:

$$Y_t = C + a_1 Y_{t-1} + a_2 Y_{t-7} + b_0 X_t + b_1 X_{t-1} + b_2 X_{t-2} + \ldots et$$

Here, the term Y represents audience impressions described in the audience segment data 204 for the digital video content 114, e.g., a video series. The term $Y_t$ represents the audience impressions on a day t, as described by the audience segment data 204. The terms $Y_{t-1}$ and $Y_{t-7}$ represent the audience segment data 204 for the digital video content 114 on a previous day (t−1) and on the same day a week prior (t−7), respectively. The term X represents a binary value for the scheduled availability of the digital video content 114 described in the schedule data 206. The term $X_t$ represents a value of "1" if an episode of the digital video content 114 was made available for consumption on the day t, otherwise the term $X_t$ represents a value of "0". The term $X_{t-1}$ represents a value of "1" if an episode of the digital video content 114 was made available for consumption one day prior to the day t, otherwise the term $X_{t-1}$ represents a value of "0", and so forth. The term et represents uncorrelated error in the model and the terms C, a, and b represent regression coefficients.

In one implementation, the subsequent item 208 is identified by the digital marketing system 108 and communicated to the analytics system 106 via the request 134. For instance, the request 134 is created by a user via a GUI of the digital marketing system 108. The user thus creates the request 134 in order to use the forecast data 124 to select digital marketing content 210 in order to cause conversion of a good or service. The digital marketing content 210, for instance, may be configured as a banner ad, video, and so forth for output in conjunction with digital video content.

The linear regression module 126 employs the linear regression model 128 to process the data 202 in order to generate the forecast data 124. The forecast data 124 may be configured in a variety of ways to support a wide range of functionality. The forecast data 124 may be output in real-time, for instance, in response to the request 134. In such an instance, the forecast data 124 may be output in a variety of ways such as a visualization, value, graph, and so forth. In one example, the forecast data 124 includes a value for audience impressions 212 for the subsequent item 208 of the digital video content 114. In at least one implementation, the audience impressions 212 may then be used by the digital marketing system 108 to control selection and output of the digital marketing content 210. In another implementation, the audience impressions 212 may be used by the content distribution system 102 to package the digital video content 114 in an audience based inventory package ("audience inventory package") 214.

Additionally and alternatively, the forecast data 124 may be generated from a model regressed from multiple series of the digital video content 114. In this way, output of the forecast module 122 may be customized with respect to the request 116, and thus addresses the above described challenges of digital video content. The forecast data 124 may further include the audience segment data 204 for visualization of the past and future audience impressions in aggregate, e.g., the audience segment data 204 and the audience impressions 212.

Regardless of how the forecast data 124 is configured, the forecast data 124 is used to determine future impressions for the digital video content 114 and thereby increase accuracy in selection of the digital marketing content 210 and packaging of the digital video content 114 in the audience inventory package 214. The use of time series data in generating and using the linear regression model 128 provides a variety of other advantages, such as reducing errors and supporting additional visualization of the forecast data 124 to gain additional insight into a time series of the audience impressions 212. In this way, operations of computing devices to generate and use the model are improved. As an example, the model described herein reduces error in audience based forecasting of the audience impressions 212 versus a conventional ARIMA model and a day of week average model:

|  | Errors (%) | | | |
| --- | --- | --- | --- | --- |
|  | Daily | Weekly | Monthly | Quarterly |
| Day of Week Average | 50 | 47 | 45 | 44 |
| ARIMA | 53 | 52 | 52 | 52 |
| Forecast (FIG. 4) | 16 | 11 | 10 | 7 |

The digital marketing content 210 generally represents content selected for marketing based on the forecast data 124. In some examples, the digital marketing content 210 includes an advertisement 216 directed to a user or target audience in association with consumption of the digital video content 114.

The advertisement 216 may be any form of digital content used in a digital marketing campaign associated with the digital video content 114, such as a commercial or video advertisement that is displayed before, during and/or after the digital video content 114. In one example, the advertisement 216 is a banner ad, pop-up ad, text advertisement, virtual or augmented reality advertisement, interactive advertisement, and so forth. In some implementations, the advertisement 216 is presented by the digital marketing system 108. However, the advertisement 216 may additionally and alternatively be presented via the content distribution system 102 or a different service altogether.

The digital marketing content 210 may also include the audience inventory package 214. The audience inventory package 214 represents a group of the digital video content 114 selected for marketing as a package. For instance, the audience inventory package 214 includes two TV series packaged together. In one example, the digital video content 114 is packaged based on the forecast data 124. While in another example, multiple video series are pre-packaged and the forecast data 124 is used by the digital marketing system 108 to price the package for a particular audience segment.

Consider an example where the audience inventory package 214 includes the digital video content 114 series_1 and series_2, each representing a video series in a similar genre and/or targeted to the same audience segment. The audience inventory package 214 may then be marketed to various first-party or third-party systems that may use the audience inventory package 214 to select content to accompany the digital video content 114 for the target audience. In this way, the forecast data 124 and the digital marketing content 210 may be used to package the digital video content 114 in various forms for marketing to the target audience.

In at least some implementations, the request 134 includes the audience inventory package 214. For instance, the audience inventory package 214 includes multiple video series pre-packaged together. In one example, the audience inventory package 214 is selected via a GUI at the content distribution system 102 and/or the digital marketing system 108. In the example, the forecast data 124 is used to price the audience inventory package 214 and/or determine a size of the target audience segment for the audience inventory package 214.

When the request 134 includes the audience inventory package 214, the audience inventory package 214 is decomposed to the individual video series included. The individual video series in the audience inventory package 214 are weighted for a ratio or portion of the audience segment data 204 and the audience impressions 212 for each series included in the audience inventory package 214. Consider the example where the audience inventory package 214 includes the digital video content 114 series_1 and series_2, each representing a video series. In the example, the video series, series_1 and series_2, are weighted according to the following:

$$Y = Y_{s1} * W_{s1} + Y_{s2} * W_{s2}$$

Where Ws1 is the fraction of series_1 in the package, the fraction representing a ratio of number of impression of series_1 in the package for the audience segment identified by the segmentation data 130 and a total number of audience impressions of series_1 for all audience segments. Similarly Ws2 is the weight of series_2. Y is the total sum of audience impressions in the audience inventory package 214. Ys1 is the audience impressions of series_1 in the audience inventory package 214, and Ys2 is the audience impressions of series_2 in the audience inventory package 214.

After decomposing the audience inventory package 214 included in the request 134, the forecast data 124 is generated for each of series_1 and series_2. In the example, the forecast data 124 is recomposed via the same weighted sum equation described above. In this way, package-level impressions are calculated as a weighted sum of the audience impressions 212 for each video series included in the audience inventory package 214.

Since the data 202 may be a large set or array of data, the linear regression model 128 allows for the forecast data 124 to be generated with increased accuracy and speed, while minimizing consumption of processing resources compared to convention techniques for forecasting audience impressions for a target audience segment. In this way, the analytics system 106 provides a user (e.g., the content distribution system 102 or the digital marketing system 108) with real-time analysis of target audience behavior in consuming the digital video content 114 with a degree of speed and accuracy not possible by analyzing such data in the human mind. Thus, the linear regression model solves a problem that is unique to digital technologies, specifically the technologies associated with digital marketing and content distribution.

Figure 3:
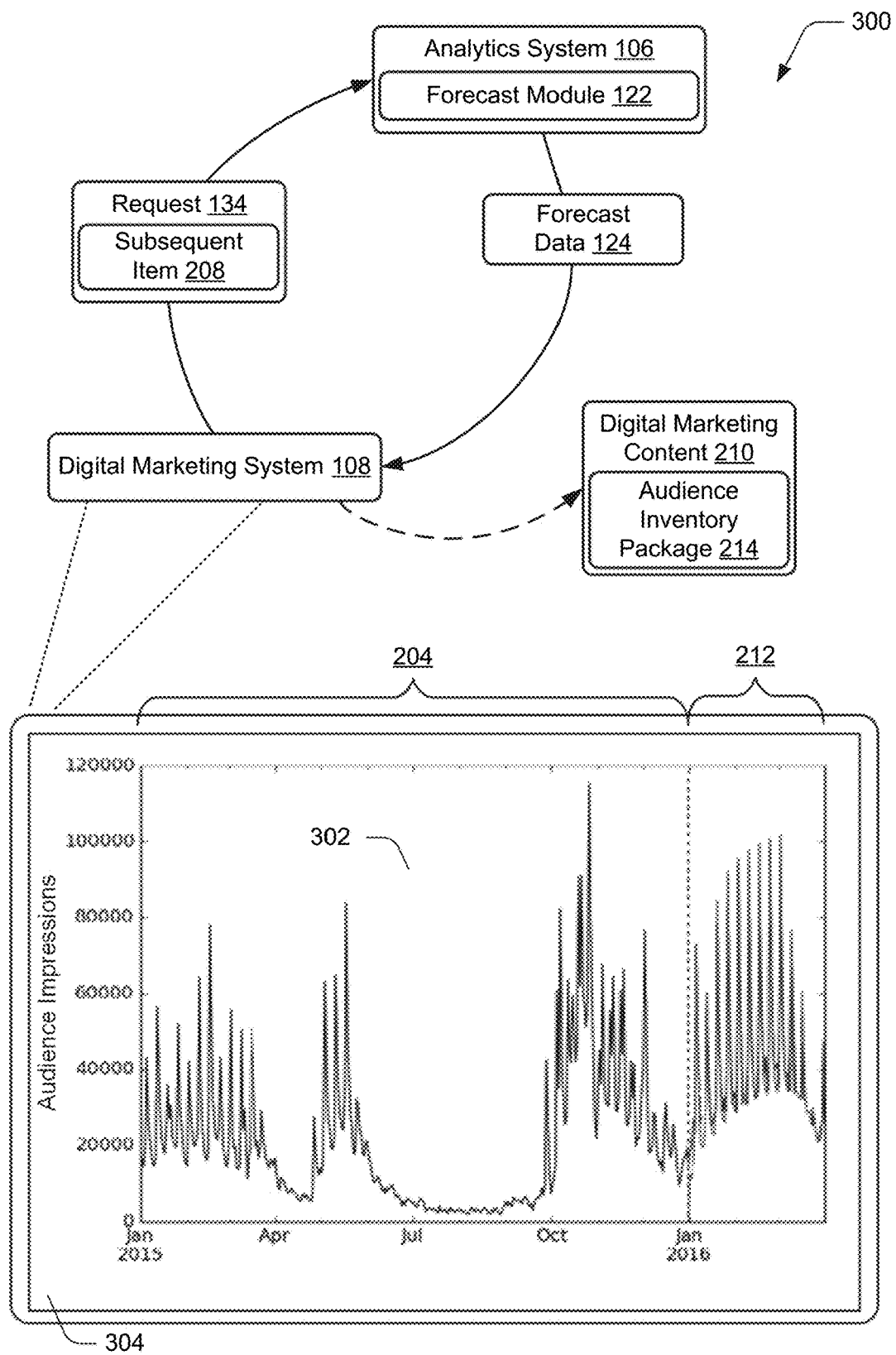
FIG. 3 depicts an example implementation showing a visualization presented via a graphical user interface.

FIG. 3 depicts an example implementation 300 showing a visualization 302 of past and forecasted audience impressions of the digital video content 114. The visualization 302 is presented via a graphical user interface ("GUI") 304 at the digital marketing system 108 in the example shown. Additionally and alternatively, the visualization 302 may be presented at a computing device other than the digital marketing system 108.

The visualization 302 generally represents a visual summary of data associated with the digital video content 114, such as the audience segment data 204, the audience impressions 212 as so forth. While the visualization 302 is illustrated in FIG. 3 as a line graph, it should be understood that the visualization 302 may be configured in any manner that visually summarizes data associated with the digital video content 114.

According to one implementation, the visualization 302 is output to the GUI 304 in response to the request 134 specifying the subsequent item 208. In this example, the visualization 302 is presented including the audience segment data 204 and the audience impressions 212 for the digital video content 114. Thus, the visualization 302 illustrates to a user the past impressions for the digital video content 114 and the forecasted future impressions for the digital video content 114. In this way, the visualization 302 allows a user, for example the digital marketing system 108, to quickly and easily utilize the forecast data 124.

In one implementation, the audience inventory package 214 is identified by the request 134. While in other implementations, the audience inventory package 214 is selected based on the forecast data 124. Whether the audience inventory package 214 is received via the request 134 or selected based on the forecast data 124, the visualization 302 represents the audience inventory package 214. In the example, the audience inventory package 214 includes the digital video content 114 series_1 and series_2 packaged together, each representing a TV series. For instance, series_1 and series_2 are packaged based on the forecast data 124. The audience inventory package 214, for instance, is weighted for a ratio or portion of the audience segment data 204 and the audience impressions 212 for each series included in the audience inventory package 214, as described above. In another instance, the audience inventory package 214 is a weighted sum of the audience segment data 204 and the audience impressions 212 for series_1 and series_2.

Figure 4:
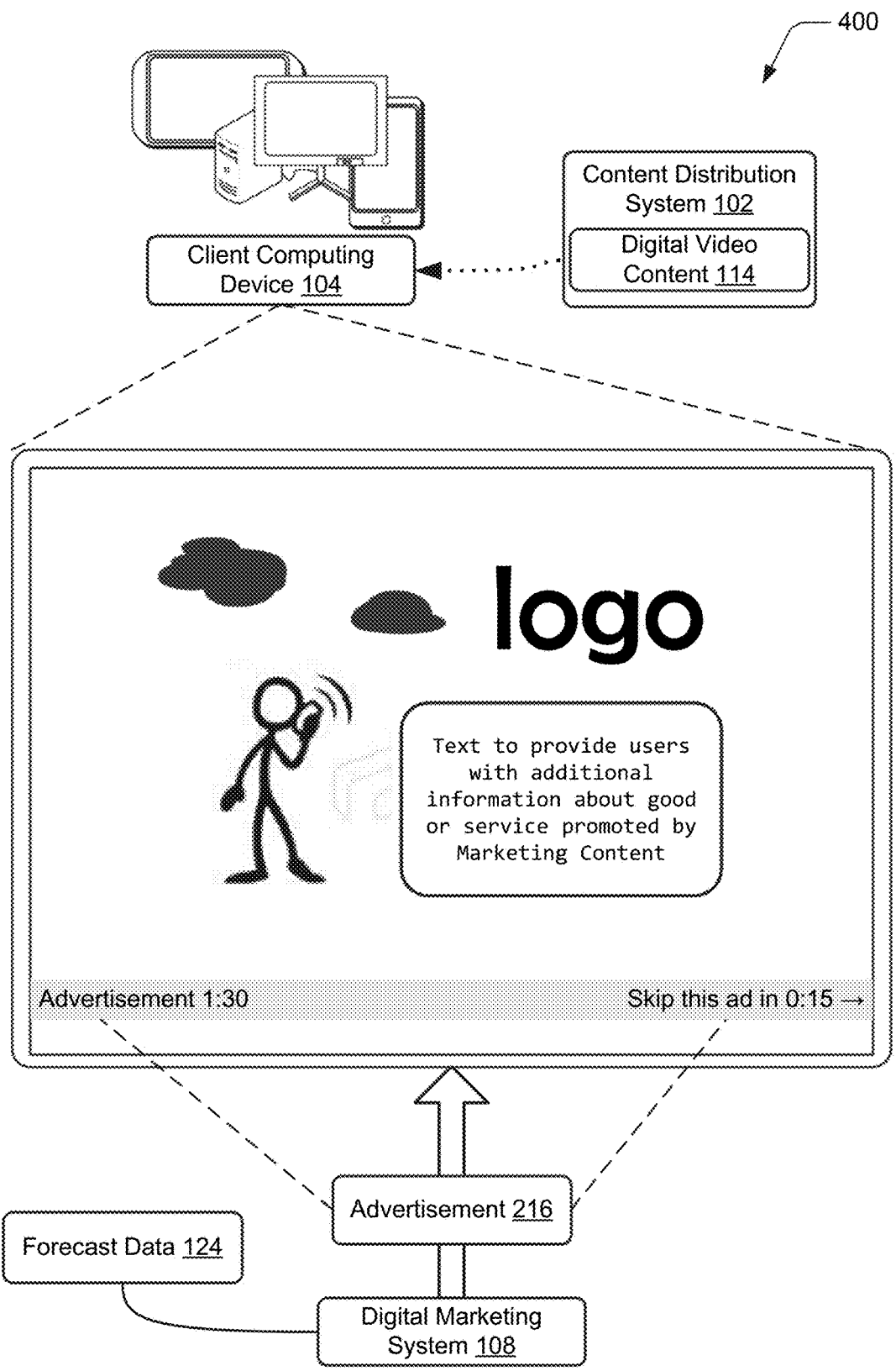
FIG. 4 depicts an example implementation showing digital marketing content presented for consumption by an audience in association with digital video content.

FIG. 4 depicts an example implementation 400 showing the advertisement 216 presented for consumption by an audience in association with the digital video content 114. The digital marketing system 108 presents the advertisement 216 in association with consumption of the digital video content 114 at the client computing device 104. In this example, the client computing device 104 renders the digital video content 114 via the content distribution system 102. Additionally and alternatively, the advertisement 216 may be received by the content distribution system 102, the client computing device 104, or a different computing device for presentation. While the advertisement 216 is shown as being configured as a video ad with an option to skip the video ad, it should be understood that the advertisement 216 may be presented in association with the digital video content 114 in a number of configurations as described above.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
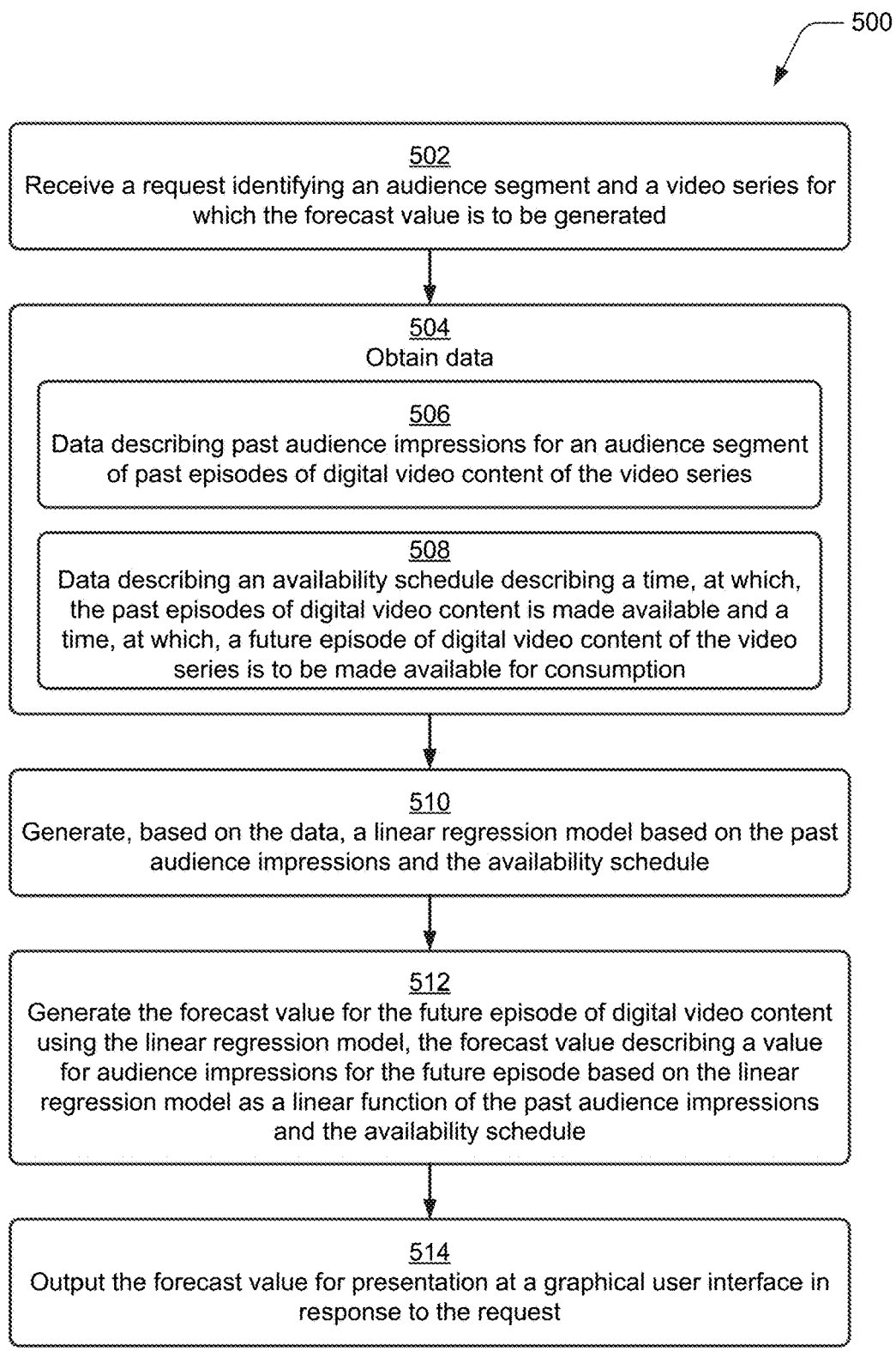
FIG. 5 is a flow diagram depicting a procedure in an example implementation in which a linear regression model is generated and used to generate forecast data.

FIG. 5 depicts a procedure 500 in an example implementation in which a linear regression model is used to generate forecast data. To begin, a request is received identifying an audience segment and a video series for which the forecast value is to be generated (block 502). The request 134, for instance, is input via a GUI at the digital marketing system 108 or the content distribution system 102. Data is obtained (block 504). The data describes past audience impressions for an audience segment of past episodes of digital video content as part of a video series (block 506). The data also describes an availability schedule. The availability schedule describes a time, at which, the past episodes of digital video content of a video series are made available for consumption and a time at which, a future episode of digital video content of the video series is scheduled to be made available for consumption in the future (block 508). The schedule data 206, thus, describes past and future schedule of availability for the digital video content 114, e.g., particular episodes in a video series.

Based on the data, a linear regression model is generated (block 510). The linear regression model is generated as a linear function of the past audience impressions and the availability schedule. The linear regression module 126, for instance, regresses a relationship between the past audience impressions of past episodes of digital video content and the times, at which, the past episodes of digital video content are made available. In one implementation, the linear regression model 128 is configured to account for lag effects of the time series values described by the data 202 through use of a weighting.

A forecast value is generated for the future episode of digital video content using the linear regression model. The forecast value describes a value for audience impressions for the future episode based on the linear regression model as a linear function of the past audience impressions and the availability schedule (block 512). The audience impressions 212 may represent a number of users in an audience consuming the subsequent item 208 and/or content associated with the digital video content 114. The availability data 132 may be available via a variety of publically accessible or proprietarily accessible sources, according to various implementations.

The forecast value is output for presentation at a graphical user interface in response to the request (block 514). For instance, the forecast data 124 is output to a digital marketing system 108 in response to the request 134 to forecast audience impressions of the future episode of digital video content 114. In one example, the forecast data 124 is output to a GUI through which the request 134 for the forecast data 124 was initiated. For instance, the forecast data 124 is presented via the GUI as a visualization which includes the past audience impressions. In some instances, the digital marketing content 210 is selected based on the forecast data 124 in response to the request 134.

The forecast data 124 enables selection of the digital marketing content 210 associated with the digital video content 114. For example, the advertisement 216 is selected by the digital marketing system 108, based on the audience impressions 212, and output for presentation at a computing device in association with consumption of the digital video content 114. In another example, the audience inventory package 214 including the digital video content 114 is created based on the forecast data 124.

Example System and Device

FIG. 6 illustrates an example system generally at 600 that includes an example computing device 602 that is representative of one or more computing systems and/or devices that may implement the various techniques described herein. This is illustrated through inclusion of the forecast module 122. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate a forecast value, a method implemented by at least one computing device, the method comprising:
   receiving, by the at least one computing device, a request identifying an audience segment and a video series for which the forecast value is to be generated;
   obtaining, by the at least one computing device, data describing:
      past audience impressions of past episodes of the video series by the audience segment; and
      an availability schedule specifying a time at which the past episodes of the video series are made available for consumption by the audience segment and a time at which a future episode of the video series is to be made available for consumption by the audience segment;
   determining, by the at least one computing device, a plurality of weighted regression coefficients describing diminishing daily lag effects of the availability schedule on the past audience impressions over time, each of the plurality of weighted regression coefficients corresponding to a different day;
   generating, by the at least one computing device, a linear regression model based on the past audience impressions, the plurality of weighted regression coefficients, and the availability schedule, the linear regression model accounting for the daily lag effects and describing a relationship between the past audience impressions and the availability schedule;
   generating, by the at least one computing device, the forecast value using the linear regression model, the forecast value describing future audience impressions for the future episode; and
   outputting, by the at least one computing device, the forecast value at a graphical user interface in response to the request.

2. The method as described in claim 1, wherein the request is received via user input at the graphical user interface and the forecast value is output in real-time in response to the request.

3. The method as described in claim 1, wherein the video series comprises serialized digital video content episodes distributed for sequential consumption.

4. The method as described in claim 1, further comprising selecting, based on the forecast value, digital marketing content to be presented in conjunction with the future episode.

5. The method as described in claim 1, further comprising generating a digital marketing audience inventory package based on the forecast value.

6. The method as described in claim 5, further comprising generating a forecast value for each of a plurality of future episodes of a plurality of video series, wherein the digital marketing audience inventory package is generated based on the forecast values for the plurality of future episodes.

7. The method as described in claim 6, wherein generating the digital marketing audience inventory package includes packaging digital content with each of the plurality of video series based on the generated forecast values.

8. The method as described in claim 1, wherein the request further identifies a digital marketing audience inventory package comprising a plurality of video series, the method further comprising:
   decomposing the audience inventory package to the plurality of video series;
   performing the steps of obtaining the data, determining the plurality of weighted regression coefficients, generating the linear regression model, and generating the forecast value for each of the plurality of video series;
   determining a weight for each of the plurality of video series based on the corresponding forecast value, the weight representing a portion of a total number of audience impressions for the digital marketing audience inventory package;
   recomposing the digital marketing audience inventory package as a sum of weighted forecast values for the plurality of video series based on the weights; and
   outputting the sum of the weighted forecast values as the forecast value for presentation at the graphical user interface in response to the request.

9. The method as described in claim 1, wherein outputting the forecast value further comprises outputting a display of the data describing the past audience impressions of past episodes of digital video content as part of the video series.

10. The method as described in claim 1, wherein the audience segment is defined by demographic information specifying at least one of an age, an age group, a gender, an income range, or a language for the audience segment.

11. The method as described in claim 1, wherein the audience segment is defined by a geographic location.

12. The method as described in claim 1, wherein the audience segment is defined by information describing a viewing platform used to consume the video series.

13. In a digital medium environment to generate a forecast value, a method implemented by at least one computing device, the method comprising:
   obtaining, by the at least one computing device, data describing:
      past audience impressions of past episodes of a video series by an audience segment; and
      an availability schedule specifying a time at which the past episodes are made available for consumption by the audience segment and a time at which a future episode of the video series is to be made available for consumption by the audience segment;
   determining, by the at least one computing device, a plurality of weighted regression coefficients describing diminishing daily lag effects of the availability schedule on the past audience impressions over time, each of the plurality of weighted regression coefficients corresponding to a different day;

generating, by the at least one computing device, a linear regression model based on the past audience impressions, the plurality of weighted regression coefficients, and the availability schedule, the linear regression model accounting for the daily lag effects and describing a relationship between the past audience impressions and the availability schedule;

generating, by the at least one computing device, the forecast value for the future episode based on the linear regression model, the forecast value describing future audience impressions for the future episode; and outputting, by the at least one computing device, digital content with the future episode, the digital content selected based on the forecast value.

14. The method as described in claim 13, wherein the digital content comprises a digital marketing audience inventory package that includes a plurality of video series.

15. The method as described in claim 13, wherein the digital content comprises an advertisement.

16. The method as described in claim 13, wherein the audience segment is defined by demographic information specifying at least one of an age, an age group, a gender, an income range, or a language for the audience segment.

17. The method as described in claim 13, wherein the audience segment is defined by information describing a viewing platform used to consume the video series.

18. In a digital medium environment to generate a forecast value, a system comprising:
   means for receiving a request identifying an audience segment and a video series for which the forecast value is to be generated;
   means for obtaining data describing:
      past audience impressions of past episodes of the video series by the audience segment; and
      an availability schedule specifying a time at which the past episodes are made available for consumption by the audience segment and a time at which a future episode of the video series is to be made available for consumption by the audience segment;
   means for determining a plurality of weighted regression coefficients describing diminishing daily lag effects of the availability schedule on the past audience impressions over time, each of the plurality of weighted regression coefficients corresponding to a different day;
   means for generating a linear regression model based on the plurality of weighted regression coefficients, the past audience impressions, and the availability schedule, the linear regression model accounting for daily lag effects and describing a relationship between the past audience impressions and the availability schedule;
   means for generating the forecast value for the future episode using the linear regression model, the forecast value describing future audience impressions for the future episode; and
   means for outputting the forecast value.

19. The system as described in claim 18, wherein the request is received via an input at the user interface and the forecast value is output in real-time in response to the request.

20. The system as described in claim 18, wherein the forecast value is output at a user interface with a display of the data describing the past audience impressions.

* * * * *